(12) United States Patent
Abolhassani et al.

(10) Patent No.: US 10,346,401 B2
(45) Date of Patent: Jul. 9, 2019

(54) QUERY REWRITING IN A RELATIONAL DATA HARMONIZATION FRAMEWORK

(71) Applicant: Accenture Global Solutions Limited, Dublin (IE)

(72) Inventors: Neda Abolhassani, Athens, GA (US); Teresa Sheausan Tung, San Jose, CA (US); Karthik Gomadam, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 340 days.

(21) Appl. No.: 15/227,605

(22) Filed: Aug. 3, 2016

(65) Prior Publication Data
US 2018/0011903 A1   Jan. 11, 2018

Related U.S. Application Data

(60) Provisional application No. 62/359,547, filed on Jul. 7, 2016.

(51) Int. Cl.
*G06F 16/2452* (2019.01)
*G06F 16/2453* (2019.01)
*G06F 16/242* (2019.01)

(52) U.S. Cl.
CPC ...... *G06F 16/24549* (2019.01); *G06F 16/243* (2019.01); *G06F 16/24526* (2019.01)

(58) Field of Classification Search
USPC ........................................................ 707/713
See application file for complete search history.

(56) References Cited

U.S. PATENT DOCUMENTS

| | | | |
|---|---|---|---|
| 2002/0143754 A1* | 10/2002 | Paulley | ............ G06F 17/30448 |
| 2009/0094216 A1 | 4/2009 | Hou et al. | |
| 2009/0138437 A1 | 5/2009 | Krishnamoorthy et al. | |
| 2009/0300002 A1 | 12/2009 | Thomas et al. | |

(Continued)

OTHER PUBLICATIONS

Angles et al., "The Expressive Power of SPARQL" dated Oct. 26, 2008, Network and Parallel Computing; [Lecture notes in computer science; Lect. Notes Computer]; Springer International Publishing, Cham., pp. 114-129, XP047406112.

(Continued)

*Primary Examiner* — Muluemebet Gurmu
(74) *Attorney, Agent, or Firm* — Brinks Gilson & Lione (57) ABSTRACT

A query rewriting processor (processor) analyzes database semantic models (e.g., RDF knowledge graphs) that capture the interconnections (e.g., foreign and primary key links to other tables) present in a relational database. The processor generates an enriched model query given an initial model query (e.g., a SPARQL query) against the semantic model. The processor generates the enriched model query and translates the enriched model query into a relational database query (e.g., an SQL query). The processor may then pass the relational database query to another system or process (e.g., a data virtualization layer) for execution against the individual relational databases. In this manner, the processor automatically translates queries for information about the relational database structure to a corresponding or matching query for data from the relational database structure.

11 Claims, 6 Drawing Sheets

(56) References Cited

U.S. PATENT DOCUMENTS

| | | | |
|---|---|---|---|
| 2010/0241637 A1* | 9/2010 | Kissner | G06F 17/3051 707/752 |
| 2013/0124500 A1* | 5/2013 | Beavin | G06F 17/30448 707/714 |
| 2015/0269223 A1 | 9/2015 | Miranker et al. | |
| 2016/0103931 A1 | 4/2016 | Appavu | |

OTHER PUBLICATIONS

European Patent Office, Extended European Search Report from Europe Application No. 16187202.3 dated Dec. 1, 2017, 13 pages.

Byrne, K., Relational Database to RDF Translation in the Cultural Heritage Domain, 2008, pp. 1-16, School of Informatics, University of Edinburgh, Scotland.

Chan, L., Presto. Interacting with petabytes of data at Facebook, Nov. 6, 2013, pp. 1-3, retrieved from Internet on Nov. 18, 2016, https://www.facebook.com/notes/facebook-engineering/presto-interacting-with-petabytes-of-data-at-facebook/10151786197628920.

Chebotko, A., et al., Semantics Preserving SPARQL-to-SQL Translation, Apr. 2, 2009, pp. 973-1000, Data & Knowledge Engineering, vol. 68, No. 10, Elsevier B.V., Amsterdam, The Netherlands.

De Virgilio, R., et al., Converting Relational to Graph Databases, Proceedings of the First International Workshop on Graph Data Management Experiences and Systems, Jun. 23, 2013, pp. 1-6, New York, NY.

Dharmasiri, H., et al., A Federated Approach on Heterogeneous NoSQL Data Stores, IEEE International Conference on Advances in ICT for Emerging Regions, Dec. 12-13, 2013, pp. 234-239, Colombo, Sri Lanka.

Galkin, M., et al., Integration Strategies for Enterprise Knowledge Graphs, IEEE Tenth International Conference on Semantic Computing (ICSC), 2016, pp. 1-8, Institute of Electrical and Electronics Engineers, New York, NY.

Hausenblas, M., et al., Apache Drill: Interactive Ad-Hoc Analysis at Scale, pp. 100-104, Big Data, Jun. 2013, vol. 1, No. 2, Mary Ann Liebert, Inc. Publishers, New Rochelle, NY.

Mallede, W.Y., et al., Algorithms for Mapping RDB Schema to RDF for Facilitating Access to Deep Web, WEB 2013: The First International Conference on Building and Exploring Web Based Environments, 2013, pp. 32-41, International Academy, Research, and Industry Association (IARIA), Wilmington, DE.

Melnik, S., et al., Dremel: Interactive Analysis of Web-Scale Datasets, Proceedings of the $36^{th}$ International Conference on Very Large Data Bases, pp. 330-339, Sep. 13, 2010, Singapore.

Michel, F., et al., A survey of RDB to RDF translation approaches and tools, pp. 1-24, 2013, University of Nice, France.

Ochiai, K., et al., A Metadata Schema Design Model and Support System Based on an Agile Development Model, pp. 921-927, Mar. 2014, iConference 2014 Proceedings, Berlin, Germany.

Prud'hommeaux, E., et al., A Mapping of SPARQL Onto Conventional SQL, pp. 1-15, 2009, World Wide Web Consortium (W3C), Cambridge, United Kingdom.

Sheth, A.P., et al., Federated Database Systems for Managing Distributed, Heterogeneous, and Autonomous Databases, pp. 183-236, Sep. 1990, vol. 22, No. 3, ACM Computing Surveys (CSUR), Association for Computing Machinery, New York, NY.

Taneja, K., et al., Linked Enterprise Data Model and its use in Real Time Analytics and Context-Driven Data Discovery, pp. 277-283, Jun. 27-Jul. 2, 2015, 2015 IEEE International Conference on Mobile Services (MS), Institute of Electrical and Electronics Engineers, New York, NY.

Patent Examination Report No. 1, Australia Patent App. No. 2016222437, dated Oct. 13, 2016, pp. 1-5, Australia.

* cited by examiner

QUERY REWRITING IN A RELATIONAL DATA HARMONIZATION FRAMEWORK

PRIORITY CLAIM

This application claims priority to U.S. provisional application Ser. No. 62/359,547, filed 7 Jul. 2016.

TECHNICAL FIELD

This disclosure relates to database systems, and to queries executed in database systems.

BACKGROUND

The processing power, memory capacity, available disk space, and other resources available to processing systems have increased exponentially in recent years. Database systems in particular have grown in capacity and capability to power extremely complex and sophisticated analyses on immense datasets that discover useful information, suggest conclusions, and support decision-making. Improvements in database systems will further advance database capabilities.

DETAILED DESCRIPTION

Enterprises store their data in multiple different databases. The databases are established for many reasons and according to many different factors such as data structure, volatility, data type, volume, and security level. With multiple different databases, combining data from varied sources into integrated, unambiguous and consistent information is a requirement for the enterprise data management plan. Data Virtualization (DV) harmonizes and integrates data from diverse sources, locations, and structures and offers an interface to the user which hides the technical details of stored data, such as access language and storage technologies. DV provides an abstraction layer that has the advantage of not replicating data in a giant data warehouse, and allowing access to data without requiring applications to know technical details about the data, such as how the data is formatted, where it is physically stored, or even in what databases or tables the data resides.

The query rewriting processor ("processor") described below captures database interactions in a semantic model (e.g., a Resource Description Framework (RDF) model). The semantic model may employ a labeled, directed acyclic graph structure. The semantic models are mappings from the relational database structure, including interconnections, to a description framework (e.g., RDF). The processor provides a comprehensive approach for query rewriting in a data harmonization framework where the data is located in relational data stores. The processor thereby improves underlying computer system implementations that include relational databases. In particular, the processor allows a system to accurately and efficiently generate and issue structured query language (SQL) queries, e.g., through a DV layer, with the SQL query automatically enhanced with knowledge about the database interactions that the processor discovers from the initial model query and the semantic models.

Expressed another way, in one implementation the processor generates, references, or obtains database semantic models (e.g., RDF knowledge graphs). The semantic models capture the structure and interconnections (e.g., foreign and primary key links to other tables) present in relational databases. The purpose of the initial model query (e.g., a SPARQL query) is to interrogate the semantic model for structural information about the relational databases. This is often done as a first step in ultimately obtaining information from the databases, given that the DV layer hides the technical implementation details about the data.

The processor generates the enriched model query and translates the enriched model query to obtain a custom relational database query (e.g., an SQL query). The processor may then pass the custom relational database query to a DV layer for execution against the individual relational databases. Said another way, the processor automatically translates queries for information about the relational database structure to a corresponding or matching query to actually obtain the relevant data from the relational database structure.

The processor may be added as a component to a very wide range of systems and enterprises that use any type of data. One example is provided for discussion purposes below, and many others are possible. In the example, a university is interested in implementing a student registration system that involves multiple tables and databases. Assume that the tables are: Student, Department, Course, and Enrolled. Any query source may ask for information about a student without knowing in which database or table the data resides. Hard coding all the database paths for each of the queries in the program would give rise to difficult maintenance issues. One technical advantage and system improvement achieved by the processor is the elimination of hard coding.

The processor maintains metadata for the databases in the semantic models, e.g., in RDF knowledge graphs. The initial model query is prepared for submission against the knowledge graphs in order to retrieve the database structure and interconnection information as a first step in obtaining data of interest. The processor dynamically translates the initial model query (e.g., a SPARQL query) to a corresponding relational query (e.g., an SQL query). The processor thereby accelerates obtaining the data of interest in an accurate and efficient manner.

Figure 1:
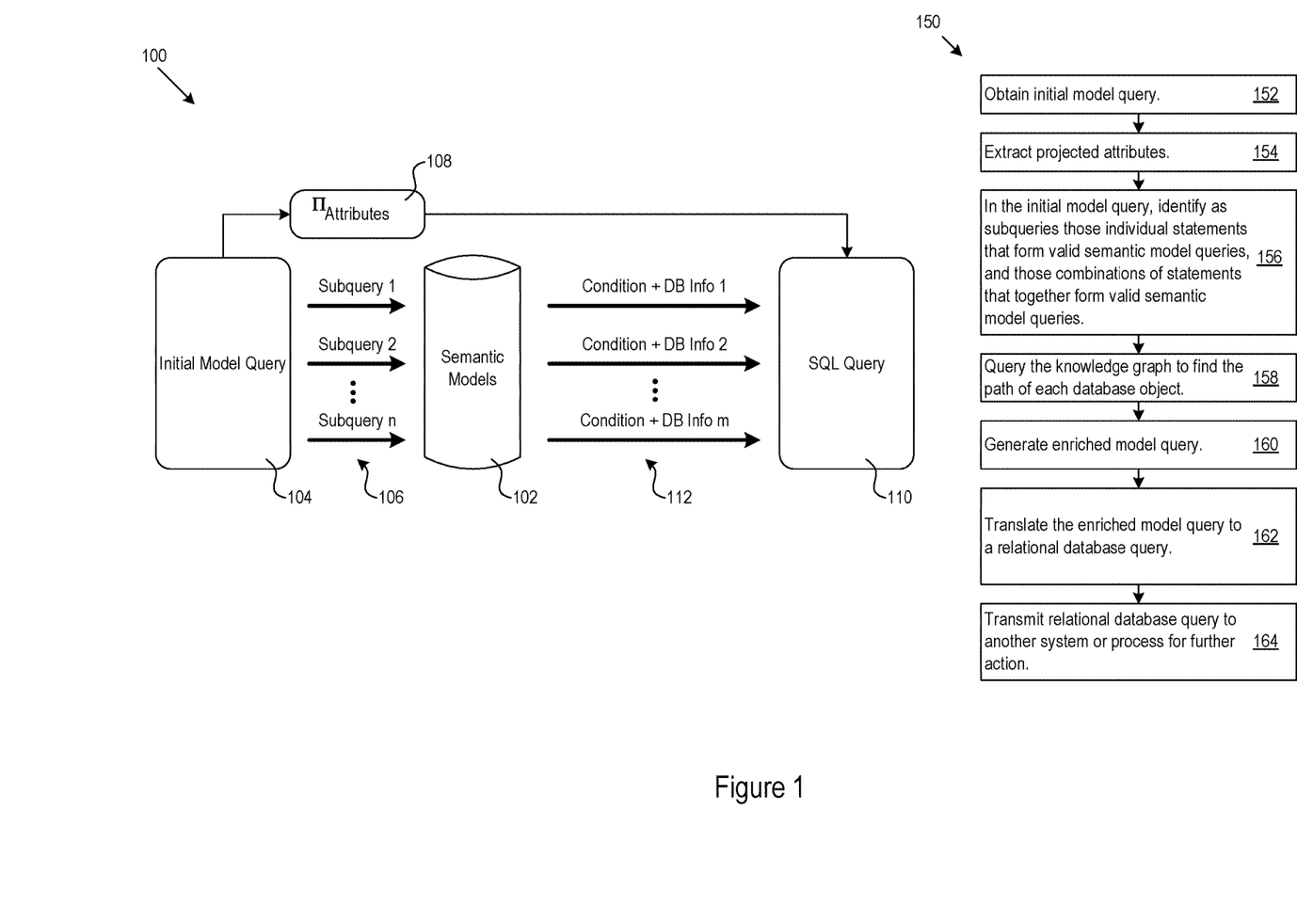
FIG. 1 shows a query rewriting architecture and query rewriting logic.

FIG. 1 shows an example of a query rewriting architecture 100 and query rewriting logic 150. As noted above, the interconnections between database objects are represented in semantic models, such as RDF knowledge graphs, and may be stored in a library of semantic models, e.g., in the semantic model database 102. The initial model query 104 has no information about the location of the desired data, and is received by the processor system, e.g., as an SPARQL query (152).

The processor extracts the projected attributes of the initial model query 104 from the initial model query 104 (154). The column names that are written after the SELECT query keyword are the projected attributes. In the student registration system example, an example of a projected attribute in the initial model query is "?name". In the translation process, the processor projects "?name" as, for instance, "Course.Name" into the relational database query. The processor scans the tuple statements in the model query, and identifies those individual statements that are valid semantic model queries, and also identifies combinations of individual statements that together form a valid model queries (165). These individual statements and combination of statements that form valid queries are the 'n' different sub-queries 106 shown in FIG. 1.

The sub-queries were written to query the knowledge graph in order to find the path of each database object (158) needed to actually obtain the data of interest. The processor executes the analysis rules to generate an enriched model query with the combination of the projected attributes 108 and the result of the sub-queries (160). The processor also translates the enriched model query to a relational database query 110 with the conditions and database information obtained after analysis and enrichment of the initial model query 104 (162). The processor may transmit the relational database query to another or system or process for further action (164), including, e.g., to a DV interface which will execute the relational query against the databases to actually retrieve the data of interest.

Semantic Model Generation

A semantic model may be implemented as a knowledge graph that captures a reference schema for database entities, their interconnections, and other and information about them. The processor may work with pre-generated knowledge graphs or may generate its own knowledge graphs. The knowledge graphs capture the schema of the relational databases. Generating the knowledge graphs may include scanning each relational schema to determine name, type and referential integrity constraints of the tables and their columns. Referential integrity may be implemented and enforced by primary and foreign key combinations. The semantic model captures the extracted information as an RDF graph with resources pointing to the database table, column names and their relationships.

Table 1, below, shows example semantic model statements for capturing a relational database schema.

TABLE 1

Semantic model statements for capturing the database schema

| Subject | Predicate | Object |
|---|---|---|
| :Database | :has_Table | :Table |
| :Table | :has_Attribute_attr | :Attribute |
| :Table | :has_pk | :PrimaryKeyAttribute |
| :Table | :has_ReferencedTable_tbl | :ForeignKeyAttribute |
| :ReferredTable | :refer_ReferredTable_tbl | :ForeignKeyAttribute |

Figure 2:
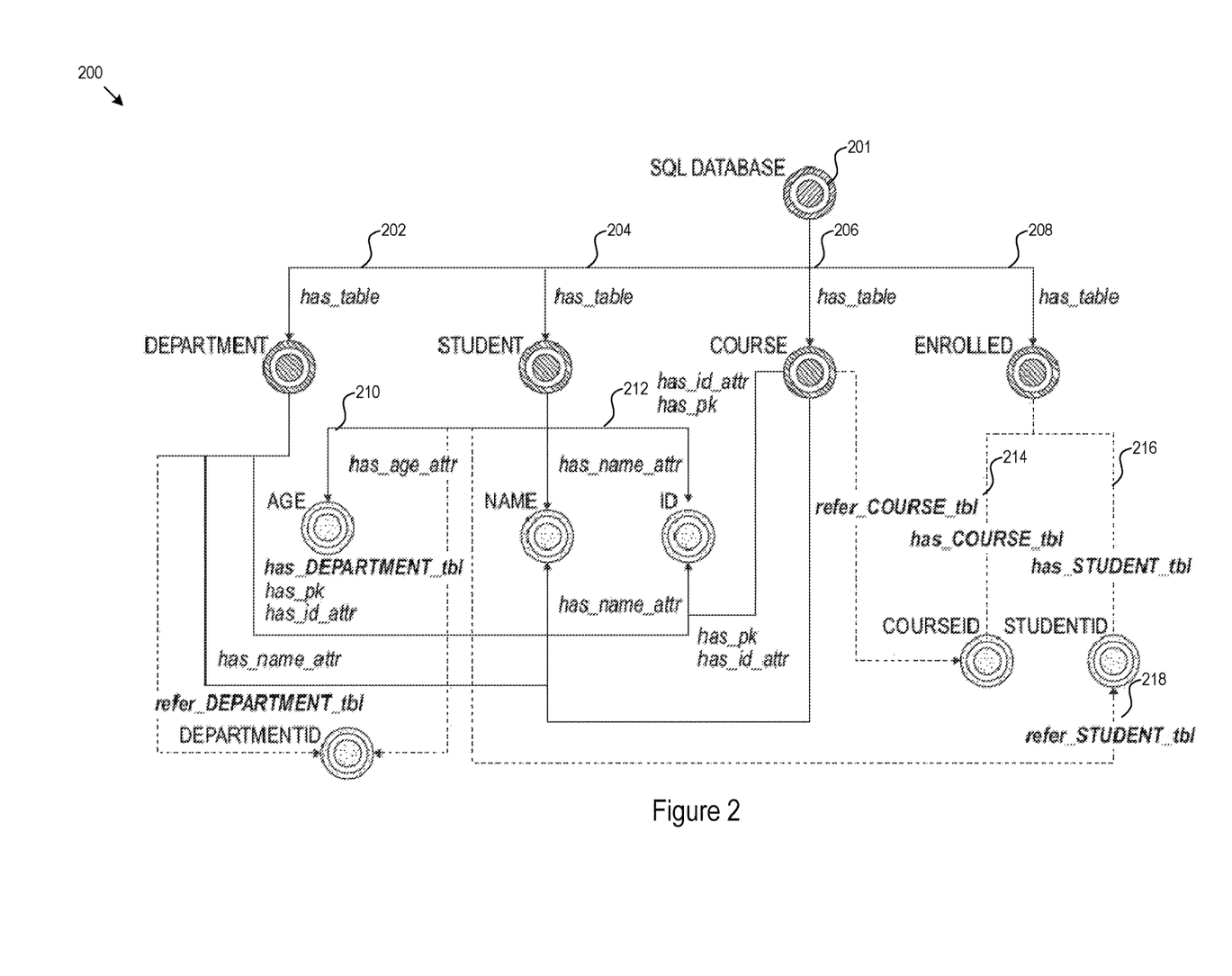
FIG. 2 illustrates a semantic model for an example database.

FIG. 2 shows an example semantic model 200 for the example university database 201. In one implementation, the semantic model stores the metadata information in RDF <subject, predicate, object> tuples in the following manner: the links are predicates and their ending nodes are subjects and objects of each RDF statement. There are links between a database schema and its tables, denoted by the "has_Table" constructs 202, 204, 206, and 208. As demonstrated in the example semantic model 200 in FIG. 2, the four tables of this example are connected to their column names with a link formed by the "has_Attribute_attr" construct, e.g., the "has_age_attr" construct 210. As can be seen in FIG. 2, the Student Table that has Age, Name, and ID columns, with the ID column being a primary key. The semantic model 200 also includes the links between tables and columns in the database for primary key attributes of the tables, using the "has_pk" construct, e.g., the "has_pk" construct 212 that captures the primary key in the ID column.

Referential integrity constraints are shown with dotted lines in FIG. 2, e.g., the referential integrity constraint 214. In this example, the Enrolled table has foreign keys to the Course and Student tables and the Enrolled table is connected to its foreign keys with referenced table links, denoted by the has_ReferencedTableName_tbl construct, e.g., the "has_STUDENT_tbl" construct 216. The referenced tables are also connected to these keys with referred table links, denoted by the refer_ReferencedTableName_tbl construct, e.g., the "refer_STUDENT_tbl" construct 218. The processor reads these links to determine constraints present in the database schema.

Translation Rules for Translating the Model Query to a Relational Query

The processor may implement any number of translation rules for converting a model query to a relational database query. Example translation rules are given below. The processor executes the translation rules to generate a relational query based on a model query (e.g., the initial model query). Note that the processor recognizes and handles situations in which the initial model query originally lacks sufficient tuple statements for a complete translation. For instance, assume a search is looking for the department of a student whose name is 'John'. The initial model query for this request in SPARQL is shown in Table 2.

TABLE 2

Query 1. SPARQL input query

SELECT ?name
  WHERE {
  :Student :has_Name_attr 'John'.
  :Student :has_Department_tbl ?d.
  ?d :has_Name_attr ?name.
  }

The processor may extract, from the initial model query of subject, predicate, object tuples, the tables and projected attributes. If one of the subjects is a uniform resource indicator (URI) and it belongs to a database according to a has_table link, then the processor may extract the subject as a table. Moreover, if multiple databases are involved in the model query which have the same table, the processor may translate that to a SQL statement including a Union for the extracted tables of the databases. The processor may implement, for example, the logic in Algorithm 1 for this processing.

Algorithm 1
Tables and Attributes Extraction

1:  attributesList ← projected attributes
2:  while (subject is URI and hasResult(?database has_table subject)) or (object is URI and hasResult(?database :has_table object)) or isTrue(predicate contains a table) do
3:     tablesList ← corresponding subject, object or
4:     predicate
5:     if ?database has more than one value then
6:        create a Union for multiple databases with the extracted table
7:     end if
8:  end while The processor may also detect query conditions after extracting the tables and attributes. If the processor finds a literal as the object of the model query, then the processor treats the literal as a condition in the where clause of the generated SQL query. The processor may generate the attribute which holds the condition by implementing and executing the logic in Algorithm 2. For the given example, Department and Student are added to the tables list and they both belong to only one database. In addition, 'John' is detected as a literal.

| Algorithm 2 Literal in the Condition |
| --- |
| 1: while (object is literal) do |
| 2:     table ← subject |
| 3:     attribute ← predicate |
| 4:     condition ← table.attribute = literal |
| 5: end while |

The processor may also detect joins by detecting when there is a co-referencing in the tuple statements. The processor detects co-referencing when the subject variable of a statement is the same as the object variable of another statement. In addition, the statement which contains the object variable has a <predicate> that has a table name (T) in its pattern (e.g., "Course" in "has_Course_tbl"). If the tuple statement which contains the object variable of co-referencing can individually be treated as a correct model query, then the tables involved in the join have a 1-to-many relationship. Otherwise, the tables have a many-to-many relationship and there is another table involved in the model query which is not indicated in the model query (recall that the query source does not have information about the actual interconnections of the database system objects).

Considering the initial model query of the student department example shown in Table 2, variable "?ed" is present as a <subject> and an <object> variable. The <predicate> of the second tuple statement which has "?ed" as its <object> variable has the Department table in its pattern as well. This pattern indicates a co-referencing. Since the second tuple statement is a correct model query based on the given semantic model, this is a 1-to-many relationship.

In the case of a 1-many relationship, the processor modifies the statement containing the subject variable of the co-referencing and adds a new statement to the model query which has the refer_T_tbl predicate. Continuing the example above, the processor enriches the initial model query as shown in Table 3.

| TABLE 3 |
| --- |
| Query 2. Enriched SPARQL query |
| SELECT ?name<br>WHERE {<br>  :Student  :has_Name_attr  'John'.<br>  :Student  :has_Department_tbl  ?d.<br>  ?dprt  :refer_Department_tbl  ?d.<br>  ?dprt  :has_Name_attr  ?name.<br>} |

In particular, the processor has modified the last two statements of the initial model query as shown in enriched model query in Table 2 to have the same subject variables ("?dprt"). The processor translates the statements by adding a join in the translated SQL query that the processor prepares. The processor queries the semantic model to find the join condition based on the primary key of the referred table and the foreign key of T. Using this additional information and the enriched model query, the processor translates the initial model query to obtain the relational query shown in Table 4.

| TABLE 4 |
| --- |
| Query 3. Translated SQL query. |
| SELECT D . name<br>FROM Student AS S<br>JOIN Department AS D<br>ON D.id = S . departmentid<br>WHERE S . name = 'John'; |

In a many-to-many relationship scenario, the processor enriches the model query by adding the mutual table between the two tables to the previously extracted tables list. Moreover, the processor may enrich the model query by changing the statement that has the object variable of the co-referencing and add new statements to impose two joins between the three tables. The processor may accomplish this with, e.g., three added statements that enrich the model query. The processor may implement and execute the join detection explained in detail in Algorithm 3 to handle the 1-to-many and the many-to-many relationships.

| Algorithm 3 Co-referencing, Joining 1-to-Many and Many-to-Many Relationships |
| --- |
| 1: for i = 1 to number of query statements do |
| 2:   subjectList ← subject of ith statement |
| 3:   objectList ← object of ith statement |
| 4:   predicateList ← predicate of ith statement |
| 5: end for |
| 6: for i = 1 to number of statements do |
| 7:   for j = 1 to number of statements do |
| 8:     %%%Co-referencing Detection%%% |
| 9:     if subjectList[j] = objectList[i] and isTrue(predicateList[i] contains a TableName) then |
| 10:       result ← SELECT objectList[i] |
| 11:       WHERE {statement[i]} |
| 12:     if result is null then |
| 13:       %%%Many-Many Relationship%%% |
| 14:       tablesList ← SELECT ?table |
| 15:       WHERE{?table : has_TableName ?o1. |
| 16:       ?table : has_subjectList[i] ?o2.} |
| 17:       ith statement ← subjectList[i] : refer_subjectList[i]_tbl ?newObject1 |
| 18:       first new statement ←?newSubject : has_subjectList[i]_tbl ?newObject1 |
| 19:       second new statement←?newSubject1 : has_TableName_tbl ?newObject2 |
| 20:       third new statement←?subjectList[j] : refer_TableName_tbl ?newObject2 |
| 21:     else |
| 22:       %%%1-Many Relationship%%% |
| 23:       new statement ←?newSubject : refer_TableName_tbl ?objectList[i] |
| 24:       jth statement ← ?newSubject predicateList[j] ?objectList[j] |
| 25:     end if |
| 26:   end if |
| 27:   end for |
| 28: end for |

Figure 3:
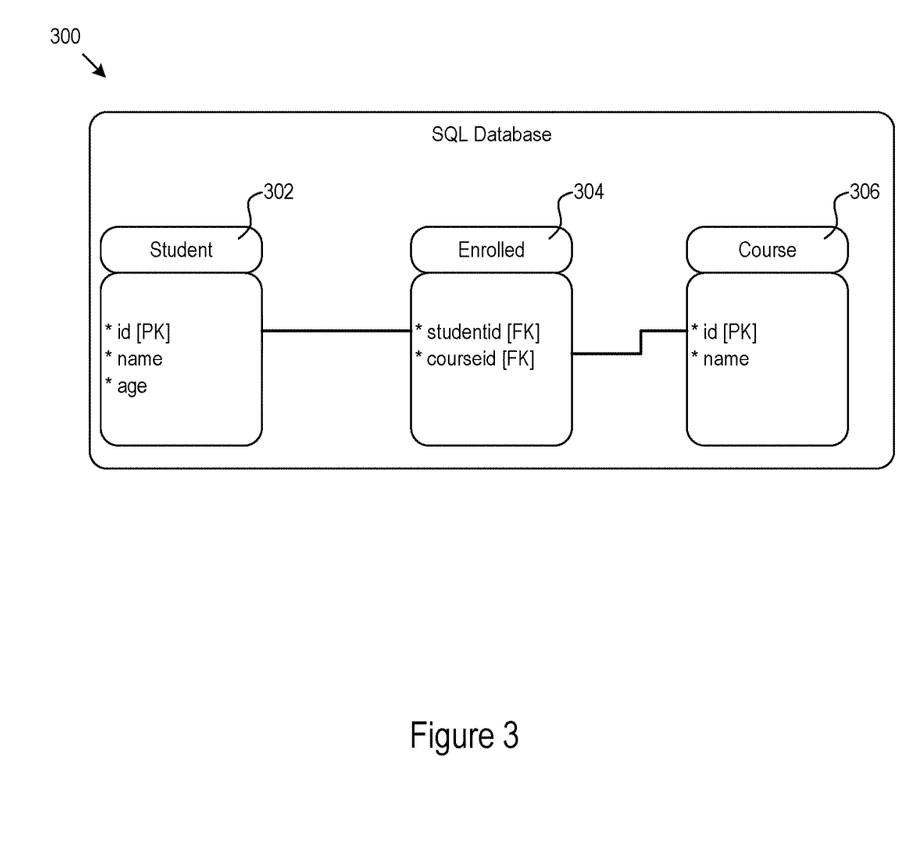
FIG. 3 shows another example database.
Figure 4:
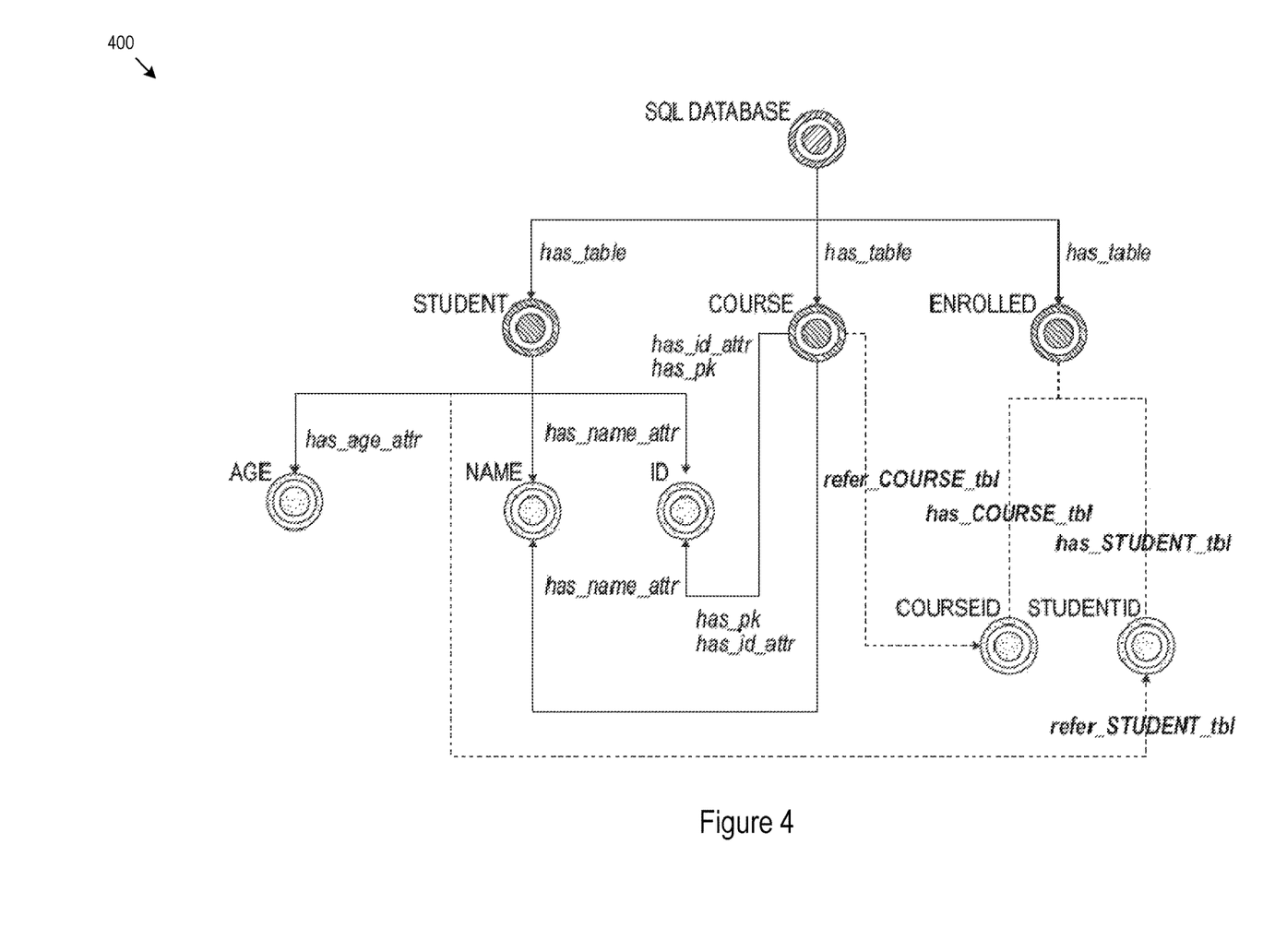
FIG. 4 shows a corresponding semantic model for the database in FIG. 3.

FIG. 3 shows another example database 300 analyzed in connection with a further example of the processor processing below. The database 300 includes a Student table 302, an Enrolled table 304, and a Course table 306. Primary keys are denoted [PK] and foreign keys [FK]. FIG. 4 shows a corresponding semantic model 400 for the database 300.

In this example, a query source asks for the course names ("?name") that a student whose name is 'Neda' has taken. Query 4 in Table 5 below is the initial model query.

TABLE 5

Query 4. SPARQL input query.

SELECT ? name
WHERE {
:Student    :has__Name__attr    'Neda'.
:Student :has__Course__tbl   ?c.
?c :has__Name__attr ?name.
}

Note that the initial model query in Table 4 lacks sufficient query statements to provide all of the information for the translation to the relational query. The initial model query does not return any result when executed against the semantic model 400 for the database 300.

The processor updates and enriches the initial model query according to the techniques described above. Specifically, the processor finds the many-to-many relationship between the Student→Enrolled and Course→Enrolled tables. The processor also executes the co-referencing rule in testing the second tuple statement to detect a mutual table. Table 6 shows the enriched model query generated by the processor. The enriched model query shows that the processor identifies and includes the Enrolled table, even though the query source was unaware of that (and all other) tables.

TABLE 6

Query 5. Enriched SPARQL query

SELECT ?name
WHERE {
:Student :has__Name__attr 'John'.
:Student :refer__Student__tbl ?sid.
?e    :has__Student__tbl ?sid.
?e    :has__Course__tbl   ?cid .
?course   :refer__Course__tbl ?cid.
?course   :has__Name__attr   ?name.
}

Tables 7-12 below show intermediate the processor makes along the way from the initial model query in Table 5 to the enriched model query shown in Table 6. Tables 7-12 also illustrate in parallel the translated relational query, as the processor determines its components, starting from empty Select, From, and Where statements that will form the translated relational query. The processor updates and enriches the initial model query by executing the rules described above. As part of the translation process, the processor discovers the tables Student, Course, and Enrolled. In addition, the processor finds the many-to-many relationship between the Student→Enrolled and Course→Enrolled tables. The processor also executes the co-referencing rule in testing the second tuple statement regarding "?sid" to detect a mutual table.

TABLE 7

Processor discovers tables Student and Course

| Input SPARQL query: | Output SQL query: |
|---|---|
| SELECT ?name<br>WHERE {<br>:Student :has__name__attr 'Neda ' .<br>:Student :has__Course__tbl ?c .<br>?c :has__name__attr ?name .<br>} | SELECT<br>FROM<br>WHERE |

Tables List={Student, Course}
Note that the processor located the Course table by extracting "Course" from the "has__Course__tbl" pattern.

TABLE 8

Processor identifies literal 'Neda' as the student of interest and prepares the translated relational query to include a corresponding selection from the Student table for the name 'Neda'.

| Input SPARQL query: | Output SQL query: |
|---|---|
| SELECT ?name<br>WHERE {<br>:Student :has__name__attr 'Neda ' .<br>:Student :has__Course__tbl ?c .<br>?c :has__name__attr ?name .<br>} | SELECT<br>FROM Student as S<br>WHERE S.name = 'Neda' |

Tables List={Course}
Note that the processor added the Student table to the output SQL query and it is not in the tables list anymore.

TABLE 9

Processor finds the variable "?c" as a Subject in a tuple statement, and "?c" is not a URI

| Input SPARQL query: | Output SQL query: |
|---|---|
| SELECT ?name<br>WHERE {<br>:Student :has__name__attr 'Neda ' .<br>:Student :has__Course__tbl ?c .<br>?c :has__name__attr ?name .<br>} | SELECT<br>FROM Student as S<br>WHERE S.name = 'Neda' |

Tables List={Course}

TABLE 10

Processor determines that running the query ":Student :has__Course__tbl ?c." against the semantic model returns no result because the Student table 302 does not refer to the Course table 306 directly.

| Input SPARQL query: | Output SQL query: |
|---|---|
| SELECT ?name<br>WHERE {<br>:Student :has__name__attr 'Neda '.<br>:Student :has__Course__tbl ?c.<br>?c :has__name__attr ?name.<br>} | SELECT<br>FROM Student as S<br>WHERE S.name = 'Neda' |

Tables List={Course}

TABLE 11

Processor identifies many-to-many relationship (Algorithm 3), and executes a custom model query against the semantic model to identify the intermediate table involved: Enrolled.

| Input SPARQL query: | Output SQL query: |
|---|---|
| SELECT ?name<br>WHERE {<br>:Student :has__name__attr 'Neda ' .<br>:Student :has__Course__tbl ?c .<br>?c :has__name__attr ?name .<br>} | SELECT<br>FROM Student AS S<br>WHERE S.name = 'Neda' |

Tables List={Course, Enrolled}

| Many-to-Many Relationship | → | SELECT ?table<br>WHERE{<br>?table :has__Course__tbl ?c.<br>?table :has__Student__tbl ?s.<br>} | → | Enrolled |

TABLE 12

Processor determines what is the key in the referenced table: ID.

| Input SPARQL query: | Output SQL query: |
|---|---|
| SELECT ?name<br>WHERE {<br>:Student :has__name__attr 'Neda ' .<br>:Student :refer__Student__tbl ?sid .<br>?e :has__Student__tbl ?sid .<br>?c :has__name__attr ?name.<br>} | SELECT<br>FROM Student AS S<br>JOIN Enrolled AS E<br>ON E.studentid = S.id<br>WHERE S.name = 'Neda' |

Tables List={Course}

| What is the key in the referenced table? | → | SELECT ?key<br>WHERE{<br>:Student :has__pk ?key.<br>} | → | ID |

TABLE 13

Final enriched model query and translated relational query

| Enriched model query | Translated relational query |
|---|---|
| SELECT ?name<br>WHERE {<br>:Student :has__Name__attr 'John'.<br>:Student :refer__Student__tbl ?sid.<br>?e :has__Student__tbl ?sid.<br>?e :has__Course__tbl ?cid .<br>?course :refer__Course__tbl ?cid.<br>?course :has__Name__attr ?name.<br>} | SELECT C.name<br>FROM Student AS S<br>JOIN Enrolled AS E<br>ON S.id = E .studentid<br>JOIN Course AS C<br>ON C . id = E . courseid<br>WHERE S . name = 'Neda' ; |

In Table 13, note that a selection of the student name is shown in the first tuple statement of the enriched model query. The statements with ?sid object variables show a join between the Student table 302 and Enrolled table 304. Moreover, the statements with ?cid object variables show the second join on the Course table 306 and the Enrolled table 304. The final tuple statement shows the source of the projected attribute which is a course name.

Figure 5:
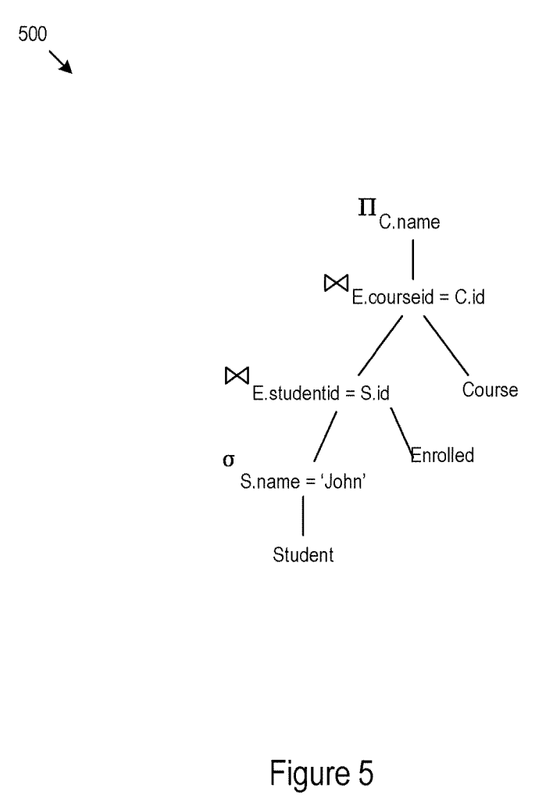
FIG. 5 shows a query tree.

FIG. 5 shows a query tree 500 used for testing and evaluation of the translated relational query in Table 6. The query tree 500 demonstrates the relational algebra expression for the translated relational query, and it is identical to the relational algebra for the enriched model query in Table 5. In other words, the query tree 500 serves as validation that the translated relational query properly matches the enriched model query.

Figure 6:
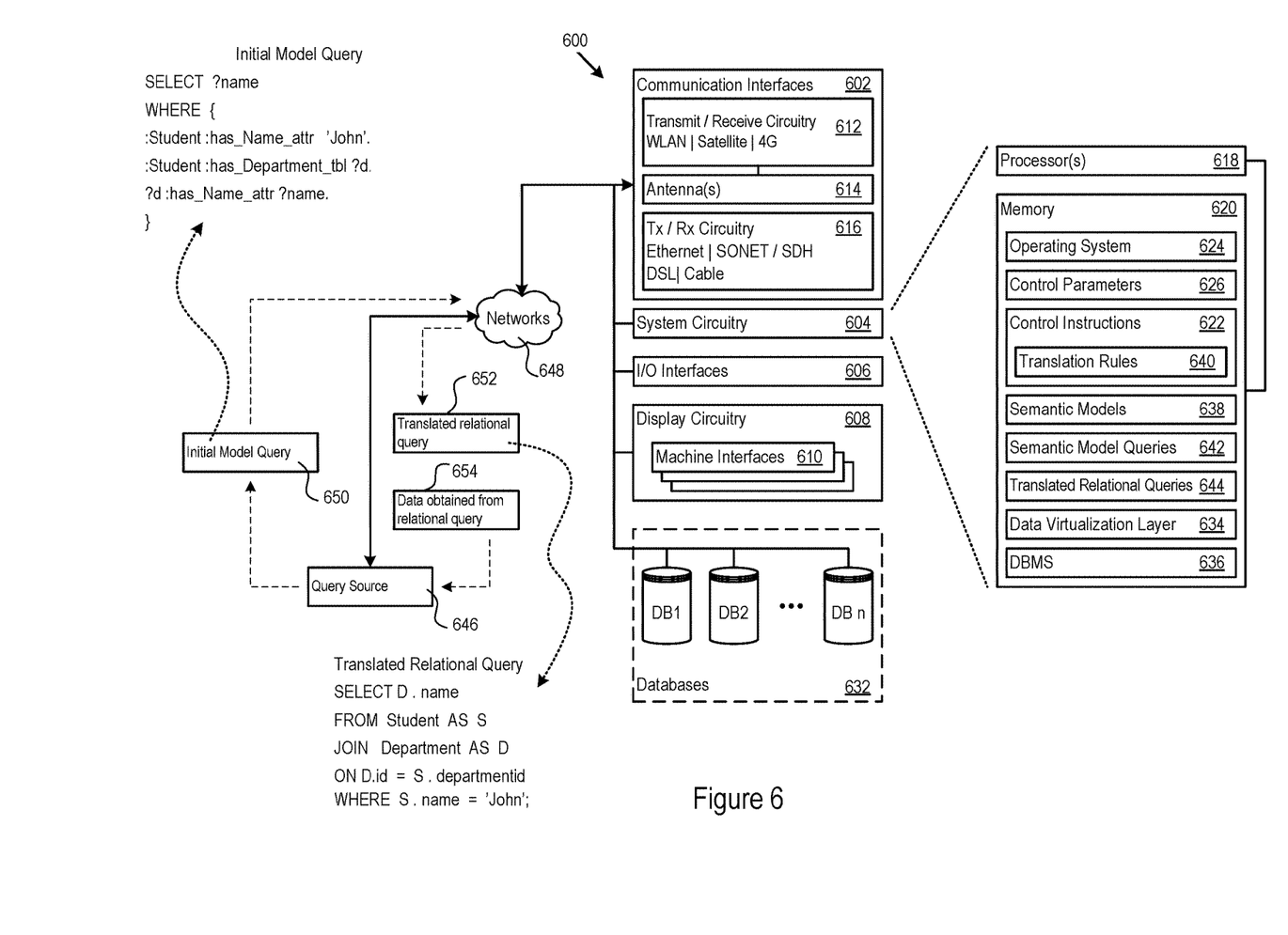
FIG. 6 shows a query rewriting processor.

FIG. 6 shows an example implementation of a query rewriting processor (processor) 600. The processor 600 includes communication interfaces 602, system circuitry 604, input/output (I/O) interfaces 606, and display circuitry 608 that generates machine interfaces 610 locally or for remote display, e.g., in a web browser running on a local or remote machine. The communication interfaces 602 may include wireless transmitters and receivers ("transceivers") 612 and any antennas 614 used by the transmit and receive circuitry of the transceivers 612. The transceivers 212 and antennas 614 may support WiFi network communications, for instance, under any version of IEEE 802.11, e.g., 802.11n or 802.11ac. The communication interfaces 602 may also include physical medium transceivers 616. The physical medium transceivers 616 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 604 may include hardware, software, firmware, or other circuitry in any combination. The system circuitry 604 may be implemented, for example, with one or more systems on a chip (SoC), application specific integrated circuits (ASIC), microprocessors, discrete analog and digital circuits, and other circuitry. The system circuitry 604 is part of the implementation of any desired functionality in the processor 600, including the translation rules and semantic models. As just one example, the system circuitry 604 may include one or more instruction processors 618 and memories 620. The memory 620 stores, for example, control instructions 622 and an operating system 624. In one implementation, the processor 618 executes the control instructions 622 and the operating system 624 to carry out any desired functionality for the processor 600. The control parameters 626 provide and specify configuration and operating options for the control instructions 622, operating system 624, and other functionality of the processor 600.

The processor 600 may connect to and interact with any number of local or remote databases 632, e.g., via a data virtualization layer 634 or database management system 636. The databases 632 define and store database table structures that the control instructions 622 access to perform the functionality implemented in the control instructions 622. The processor 600 may execute the control instructions 622 to perform the query rewriting processing noted above, including accessing the semantic models 638, and executing the translation rules 640 to enrich semantic model queries 642 and translate the semantic model queries 642 into translated relational queries 644.

The semantic models 638, translation rules 640, and control instructions 622 improve the functioning of the underlying computer hardware itself. That is, these features (among others described above) are specific improvements in way that the underlying system operates. The improvements facilitate more efficient, accurate, and precise execution of database queries received from any query source 646, whether locally or over any interface or network(s) 648. The query source 646 provides, e.g., the initial model query 650, and the processor 600 performs the processing noted above to enrich the model query, generate a translated relational query 652, and obtain corresponding database data 654 by executing the relational query 652 against relational databases. The improvements are of particular relevance in, e.g., complex data virtualization environments, to allow database details to be abstracted to avoid, e.g., hard coding and other undesirable database access techniques.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method comprising:
    receiving an initial model query, the initial model query comprising query statements, the query statements comprising instructions to interrogate a predetermined semantic model of a relational database;
    obtaining the predetermined semantic model of the relational database;
    executing query translation rules with a query rewriting processor to analyze the initial model query and the predetermined semantic model of the relational database to translate the initial model query to a relational database query
        wherein executing the query translation rules comprises:
        identifying database tables referenced by the query statements of the initial model query,
        determining a database table relationship exists among the database tables, the database table relationship comprising a many-to-many table database relationship,
        identifying a mutual table referenced by other tables in the many-to-many table database relationship,
        modifying the initial model query to generate an enriched model query comprising a new query statement, the new query statement comprising an instruction indicative of the mutual table and the other tables, and
        translating the enriched model query to the relational database query, the relational database query comprising an instruction to query the relational database and obtain database data from the other tables associated with the mutual table, the relational database query comprising at least two joins between the mutual table and the other tables; and
    transmitting result data obtained from the relational database based on the relational database query.

2. The method of claim 1, where:
    the predetermined semantic model represents tables and table relationships that are present in the relational database, but does not include the database data that is stored in the relational database.

3. The method of claim 1, wherein modifying the initial model query to generate the enriched model query further comprises:
    generating the new query statement, the new query statement indicative of a one-to-many table database relationship.

4. The method of claim 1, wherein executing query translation rules further comprises:
    identifying a literal in the initial model query; and
    creating a condition that includes the literal in a 'Where' clause in the relational database query.

5. A system comprising:
    a semantic model database comprising a library of semantic models including a specific semantic model of a relational database;
    a processor, the processor executes instructions to:
    receive an initial model query comprising tuple query statements written to interrogate the specific semantic model;
    access pre-defined query translation rules to analyze the initial model query and the specific semantic model of the relational database, the query translation rules including at least one of:
        a one-to-many translation rule;
        a many-to-many translation rule; or
        a literal translation rule;
        obtain the specific semantic model of the relational database from the library of semantic models;
    execute the query translation rules, wherein execution of the query translation rules causes the processor to:
        determine a database table relationship exists among database tables in the relational database, the database table relationship comprising a many-to-many table database relationship,
        identify a mutual table referenced by other tables in the many-to-many table database relationship,
        determine an enriched model query starting from the initial model query, the enriched model query comprising a query statement instruction indicative of the mutual table and the other tables, and
        translate the enriched model query into a relational database query, the relational database query comprising an instruction to obtain database data from the other tables corresponding to the database table relationship, the relational database query comprising at least two joins between the mutual table and the other tables; and
    transmit result data obtained from the relational database based on the relational database query.

6. The system of claim 5, wherein the tuple query statement comprise a <subject, predicate, object> query statement, wherein the one-to-many translation rule comprises instructions executable by the processor to:

identify a variable in the initial model query that is an <object> in a first query statement and also a <subject> in a second query statement;

identify a <predicate> table name in the first query statement; and determine that a one-to-many relation exists in response the <object> in the first query statement matching the <subject> in the second query statement and the <predicate> table name being included in the first query statement, wherein the many-to-many translation rule comprises instructions executable by the processor to:

identify the many-to-many table database relationship; and change the initial model query to explicitly cause the at least two joins between the mutual table and the other tables in the relational database query, wherein the literal translation rule comprises instructions executable by the processor to:

identify a literal in the initial model query; and create a condition that includes the literal in a 'Where' clause of the relational database query.

7. A system comprising:

a processor, wherein the processor executes instructions to:

receive an initial model query, the initial model query comprising query statements, the query statements comprising instructions to interrogate a predetermined semantic model of a relational database;

receive the predetermined semantic model of the relational database;

translate the initial model query to a relational database query, wherein to translate the initial model query to the relational database query, the processor further executes instructions to:

identify database tables referenced by the query statements of the initial model query;

determine a database table relationship exists among the database tables, the database table relationship comprising a many-to-many table database relationship;

identify a mutual table referenced by other tables in the many-to-many table database relationship, modify the initial model query to generate an enriched model query comprising a new query statement, the new query statement comprising an instruction indicative of the mutual table and the other tables; and convert the enriched model query to the relational database query, the relational database query comprising an instruction to query a relational database and obtain database data from the other tables associated with the mutual table, the relational database query comprising at least two joins between the mutual table and the other tables; and transmit a result set of information obtained from the relational database based on the relational database query.

8. The system of claim 7, wherein the predetermined semantic model represents tables and table relationships that are present in the relational database.

9. The system of claim 7, wherein the database table relationship comprises a one-to-many table database relationship, wherein to translate the enriched model query, the processor further executes instructions to:

receive a translation rule comprising an instruction to convert the new query statement of the enriched model query to the relational database query; and convert, based on the translation rule, the new query statement of the enriched model query to the relational database query.

10. The system of claim 7, wherein to translate the enriched model query, the processor further executes instructions to:

receive a translation rule comprising an instruction to convert the new query statement of the enriched model query to the relational database query; and convert, based on the translation rule, the new query statement of the enriched model query to the relational database query.

11. The system of claim 7, wherein the processor further executes instructions to:

identify a literal in the initial model query; and generate a condition that includes the literal in a 'Where' clause in the relational database query.

* * * * *